(12) United States Patent
Balasaygun et al.

(10) Patent No.: US 9,038,156 B2
(45) Date of Patent: May 19, 2015

(54) AUTOMATIC SIGN IN OF A USER AT MULTIPLE ENDPOINTS

(71) Applicant: Ayaya Inc., Basking Ridge, NJ (US)

(72) Inventors: Mehmet C. Balasaygun, Freehold, NJ (US); David Aherns, San Jose, CA (US); Joel M. Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 71 days.

(21) Appl. No.: 13/775,975

(22) Filed: Feb. 25, 2013

(65) Prior Publication Data

US 2014/0245418 A1 Aug. 28, 2014

(51) Int. Cl.
*G06F 21/00* (2013.01)
*H04L 29/06* (2006.01)
*G06F 21/41* (2013.01)

(52) U.S. Cl.
CPC ............ *H04L 63/0815* (2013.01); *G06F 21/41* (2013.01)

(58) Field of Classification Search
USPC .......................................................... 726/8, 9
See application file for complete search history.

(56) References Cited

U.S. PATENT DOCUMENTS

| 8,103,871 B2 * | 1/2012 | Giles et al. ..................... 713/168 |
| 8,776,132 B2 * | 7/2014 | Low et al. ........................ 725/51 |
| 2012/0265997 A1 * | 10/2012 | Laurie et al. .................. 713/185 |

OTHER PUBLICATIONS

Armando et al; "From Multiple Credentials to Browser-based Single Sign-On: Are We More Secure?" 2011; 12 pages.*

* cited by examiner

*Primary Examiner* — Jason Lee
(74) *Attorney, Agent, or Firm* — Sheridan Ross P.C.

(57) ABSTRACT

The present disclosure is directed to methods and systems for user registration, where a user is logged in to a first device in communication with a server, including: receiving an anonymous registration of a second device comprising a token, where the second device is in communication with the server; receiving a credential of the user and the token; finding the second device using the token; and registering the user on the second device using the credential.

20 Claims, 4 Drawing Sheets

AUTOMATIC SIGN IN OF A USER AT MULTIPLE ENDPOINTS

FIELD

The disclosure relates generally to methods and systems of user registration and particularly to methods and systems for users to automatically register on multiple devices.

BACKGROUND

At the present time, users typically have multiple devices that require registering (e.g., logging on) to access and use each device. Thus, it can be time consuming and inefficient for a user to log onto a network at more than one device. Prior art solutions include Single Sign-On (SSO) and Bluetooth-enabled log on.

In SSO, a user may log in once and gain access to all systems without being prompted to log in again at each of them. However, there is a problem when a user has communication credentials, which typically differ from enterprise credentials, because SSO methods do not allow automatic association of a device with a user's registration. In fact, SSO requires a user to register at the device a second time, thus requiring entry of the user's credentials twice; for example, using a user interface that is not suitable for alphanumeric entry (e.g., traditional IP telephones).

In Bluetooth-enabled log on, communication protocols use radio technology to unite various devices into one universal standard. Thus, Bluetooth enables a user to associate multiple devices with a user. However, Bluetooth is not available for all applications and devices, and additional problems exist when an application is running in a virtual environment on a virtual desktop infrastructure (VDI) device. This is because the controlling application is running in the virtual environment, and the virtual environment may not be in close proximity to the VDI device hosting the native audio/video application. In addition, Bluetooth is not able to use radio communication to register the user on the VDI device if the native audio/video of the device is already in use. Thus, problems exist when an application running in a virtual environment on a VDI device needs to be paired by the voice/video application natively running on the VDI device because the voice/video application is not able to connect the user to the virtual environment.

SUMMARY

These and other needs are addressed by the various embodiments and configurations of the present disclosure.

The following presents a simplified summary of the disclosure to provide an understanding of some aspects of the disclosure. This summary is not an extensive overview of the disclosure and its various embodiments. It is intended neither to identify key or critical elements of the disclosure nor to delineate the scope of the disclosure but to present selected concepts of the disclosure in a simplified form as an introduction to the more detailed description presented below.

The present disclosure(s) is directed generally to methods for user registration, where a user is logged in to a first device in communication with a server, including receiving an anonymous registration of a second device comprising a token, where the second device is in communication with the server; receiving a credential of the user and the token; finding the second device using the token; and registering the user on the second device using the credential.

The present disclosure is also directed generally to systems including a server; a first device in communication with the server, where a user is logged in to the first device; a second device in communication with the server, where the second device is anonymously registered with the server using a token; where the server receives a credential of the user, the token, and an association between the user and the token; where the server finds the second device using the token; and where the server registers the user on the second device using the credential.

Methods and systems disclosed herein advantageously allow a user to automatically register (e.g., log on) to multiple devices and/or applications. Further, methods and systems disclosed herein advantageously allow a user to automatically register on devices that include virtual environments. Still further, methods and systems disclosed herein advantageously allow a user to automatically register on devices where the user is using native audio/video components associated with one of the devices on which they wish to automatically register. These and other advantages will be apparent from the disclosure of the disclosure(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The term "social network" means a grouping of people having a common characteristic, such as having common interests, passions, beliefs, experiences, and/or needs. The characteristic may be positive or negative. For example, pro-republican persons are members of a pro-republican party social network infrastructure while anti-republication persons are members of an anti-republican social network. In one configuration, at least most of the social network structure members do not know one another personally, are not employed by a common business entity, and are also members of the general public. In another configuration, the social network is a social structure made of nodes which are generally individuals or organizations. It indicates the ways in which they are connected through various social familiarities ranging from casual acquaintance to close familial bonds.

The above-described embodiments and configurations are neither complete nor exhaustive. As will be appreciated, other embodiments of the disclosure are possible utilizing, alone or in combination, one or more of the features set forth above or described in detail below.

DETAILED DESCRIPTION

Figure 1:
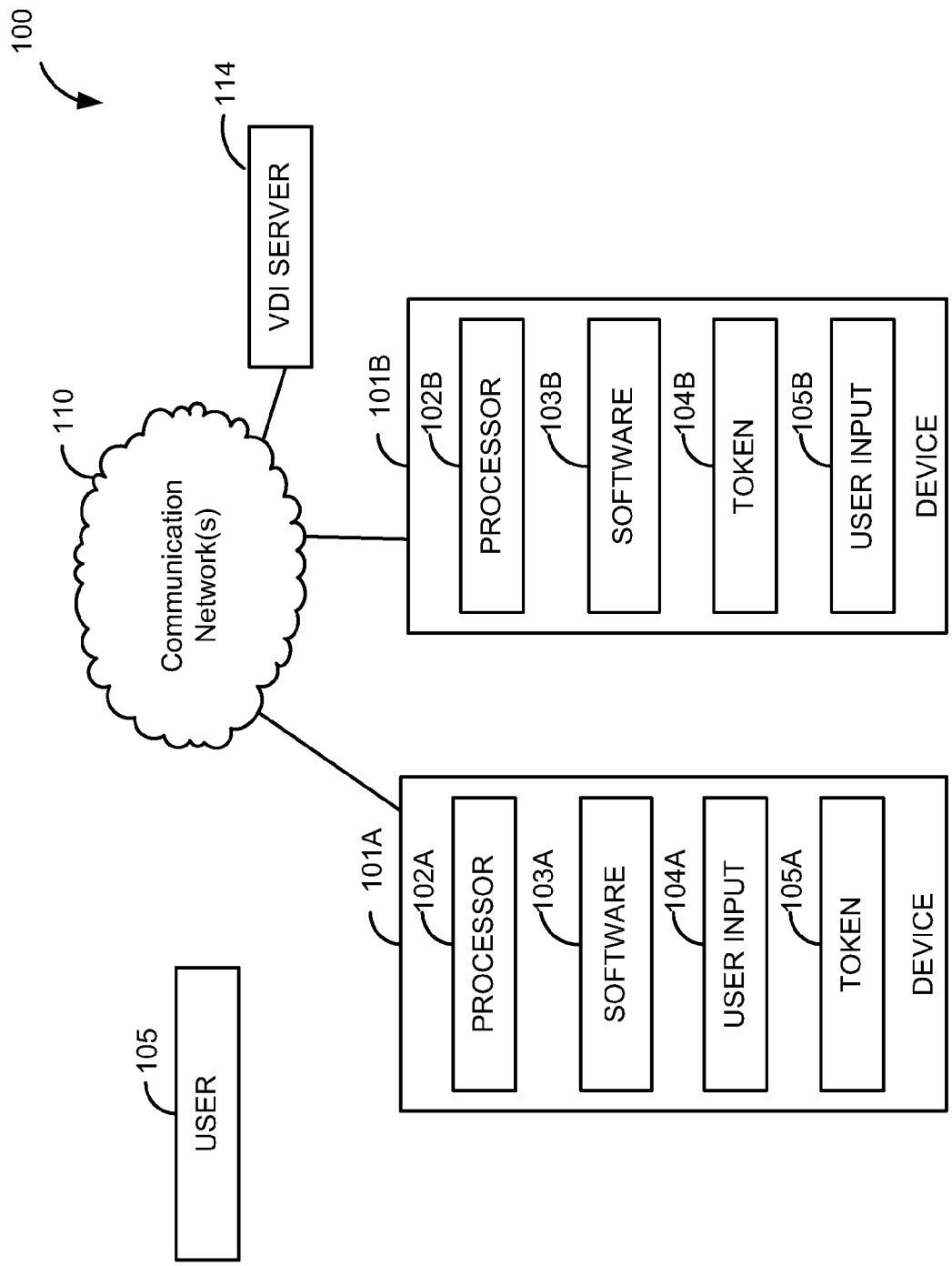
FIG. 1 is a block diagram of a system in accordance with embodiments of the present disclosure.

FIG. 1 depicts a system 100 in accordance with embodiments of the present disclosure. The system 100 includes a user 105 having multiple devices; for example device 101A and device 101B, where device 101A and device 101B are connected to a communication network 110. Devices 101A, 101B can be any communication device that can communicate on network 110. The term "device," as used herein, may also refer to applications on a device, such as enterprise software, accounting software, office suites, media players, etc. There may be multiple applications on any one device, and each device and/or application may require user registration, as described herein. Devices, for example, can be and are not limited to, a telephone, a Personal Digital Assistant (PDA), a server, a router, a Personal Computer (PC), a lap-top computer, a tablet device, a Private Branch Exchange (PBX), and/or a communication system. For example, devices may include endpoints that are softphones running in various native operating systems or using a virtual environment hosted in a data center. Although only two devices, 101A and 101B, are shown in FIG. 1, the exemplary system 100 may comprise any number of communication devices.

Network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), Voice over IP (VoIP) network, and the like. Network 110 can include any number of communication devices, as well as various types and quantities of servers, gateways, network border devices, etc.

Device 101A is depicted as including a processor 102A, software 103A, user input 104A, and token 105A. Device 101A can also be a VDI client device, an application (e.g., an application in a native or virtual environment, a softphone operating in a virtual environment, a softphone operating in native environment, or each of a softphone operating in a virtual environment and a native environment hosted in a data center), a browser, or the like. Processor 102A can be any device that can process software such as a microprocessor, a Digital Signaling Processor (DSP), a multi-core processor, a computer, and/or the like. Software 103A can be any machine-readable instruction or set of instructions that can be downloaded onto (e.g., stored in) memory of communication device 101A. For example, software 103A can include software to upgrade an operating system, software to patch an operating system, a software application, a configuration file, a user profile, a document, a spreadsheet, and/or the like. Software 103A can also include an application that may be virtually hosted and rendered on device 101A. User input can be a data structure and can be stored in memory with software 103A or as part of the software 103A. Furthermore, the data structure may be persistent or dynamic in its existence on device and may be automatically provisioned, user provisioned, or administrator provisioned. User input 104A can include user registration information, including, for example, user identification and user password. Token 105A is information identifying any device (including soft devices, such as a softphone application) requiring user registration, for example, device 101A or software 103A.

Device 101B includes a processor 102B, software 103B, token 104B, and user input 104B. Device 101B can also be a VDI client device, for example. Processor 102B can be any device that can process software such as a microprocessor, a Digital Signaling Processor (DSP), a multi-core processor, a computer, and/or the like. Software 103B can be any type of software that can be downloaded onto communication device 101B. For example, software 103B can include software to upgrade an operating system, software to patch an operating system, a software application, a configuration file, a user profile, a document, a spreadsheet, and/or the like. Software 103B can also include an application that may be virtually hosted and rendered on device 101B. Token 104B is information identifying any device (including soft devices, such as a VDI session or softphone application) requiring user registration, for example, device 101B or software 103B. For example, token 104B can be a Media Access Control (MAC) address, an identification code, or a physical identification, such as a desk number. User input can be a data structure and can be stored in memory with software 103A or as part of the software 103A. Furthermore, the data structure may be persistent or dynamic in its existence on device and may be automatically provisioned, user provisioned, or administrator provisioned. User input 104B can include user registration information, including, for example, user identification and user password.

In embodiments, devices may be VDI client devices, as described above. In addition, the network may include a VDI server 114 with channels passing data between the VDI devices and the VDI server 114. The data may be data that is generated and/or exchanged in connection with the provision of a hosted virtual PC service provided to a VDI client device by the VDI server 114. Further, VDI client devices may include a VDI communication application. As an example, but without limitation, a VDI communication application can include a soft phone function, to support communications with other VDI client devices and/or other communication devices. A VDI device may also include a virtual machine. Illustrative VDI devices are described in U.S. Patent Publication No. 2011/0208908, which is fully incorporated herein by reference. Accordingly, the VDI communication application can function as an endpoint for a telephony session implemented using the SIP or other real-time transport protocol (RTP) protocol, including, but not limited to, the secure real-time transport protocol (SRTP). More particularly, the VDI communication application can support direct RTP communications between a VDI client device and a communication endpoint. Accordingly, a RTP communication channel between VDI client devices may be received at the respective VDI communication applications of the VDI client devices.

Figure 2:
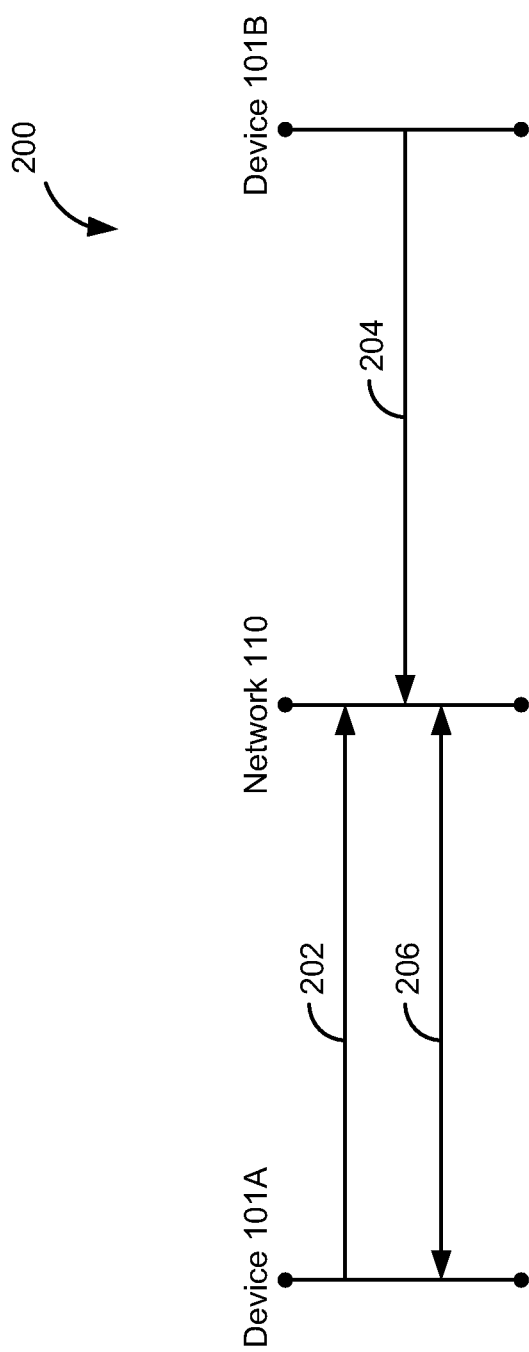
FIG. 2 depicts data flows in a system in accordance with embodiments of the present disclosure.

FIG. 2 depicts data flows in a system 200 in accordance with embodiments of the present disclosure. More particularly, FIG. 2 depicts a first device 101A and a second device 101B in communication with each other via a network 110. In this example, a user (not shown in FIG. 2) is logged-in to device 101B and the network 110 uses methods of the present disclosure to register the user on device 101A. The illustrative flow shown in FIG. 2 will now be described with respect to the system components shown in FIG. 1.

In particular, in step 202, device 101A anonymously registers with network 110 or a server connected to the network 110. Device 101A may anonymously register by providing a token (e.g., token information, such as a MAC address or desk number, for example). The anonymous registration of device 101A allows device 101A to be registered with the network 110 or a server connected to the network 110 without being associated with a user. In embodiments, when device 101A anonymously registers, device 101A may provide a token 105A to a SIP registrar, thereby becoming known to the SIP infrastructure but without being associated with a user.

The method of anonymous registration in step 202 may vary according to the type of system that is applicable to device 101A. For example, in non-virtual systems, an administrator may program a token associated with device 101A, where the programming is performed at another device (e.g., device 101B). Thus, device 101B may know the token associated with device 101A. In embodiments, if device 101B is a Windows device, device 101A's token (e.g., its MAC address) is entered by an administrator into the Windows registry (e.g., a user agnostic portion of the Windows registry) of device 101B so that any user registering on device 101B can advantageously use automatic registration with device 101A.

In step 204, a user 105 registers on device 101B, in communication with network 110. In embodiments, the user 105 may register in step 204 before or after the anonymous registration of device 101A in step 202. The user may register by entering registration information (e.g., user credentials). A user's registration information may also be known as identification and verification information; for example, a user name and password/PIN. In embodiments, in a SIP system, user credentials for user registration on one or more devices in the system are non-SIP credentials. In fact, the user credentials may be SSO information. For example, a user may log in to a desktop communication application by providing their Windows credentials (e.g., the user logs in to Windows). In embodiments, the device that the user registers with may be referred to as the "controlling device" because the device may be used to control the user's registration on a secondary device (e.g., a "controlled device," for example, device 101A). For example, the controlling device may be used to control a VDI device or telephone that is anonymously registered in the system.

In step 206, the network 210 finds device 101A for user registration and registers the user on device 101A. Initially, network 110 may find devices for which to register a user through token information. For example, device 101A may post anonymous registration information and/or token information regarding tokens for devices for which the user 105 would like to control to the network 110. In embodiments, the registration information plus the token information is posted to a SIP server over a secure channel. In further embodiments, this posting of information can be done to by a desktop configuration manager (e.g., a service co-resident on a session manager (SM), such as a personal profile manager (PPM)), and can be SIP-based and/or HTTP-based. Upon receiving the registration and token information, the network 110 (e.g., the SIP server or SM) looks for anonymously registered devices matching the token(s) that were provided by device 101B in step 202. Upon locating any anonymously registered device (e.g., device 101A) with a matching token, the network 110 sends a notification to the anonymously registered device with the user's registration information. User 105 is thereby registered on device 101A automatically (e.g., without the user having to enter registration information into device 101A).

Figure 3:
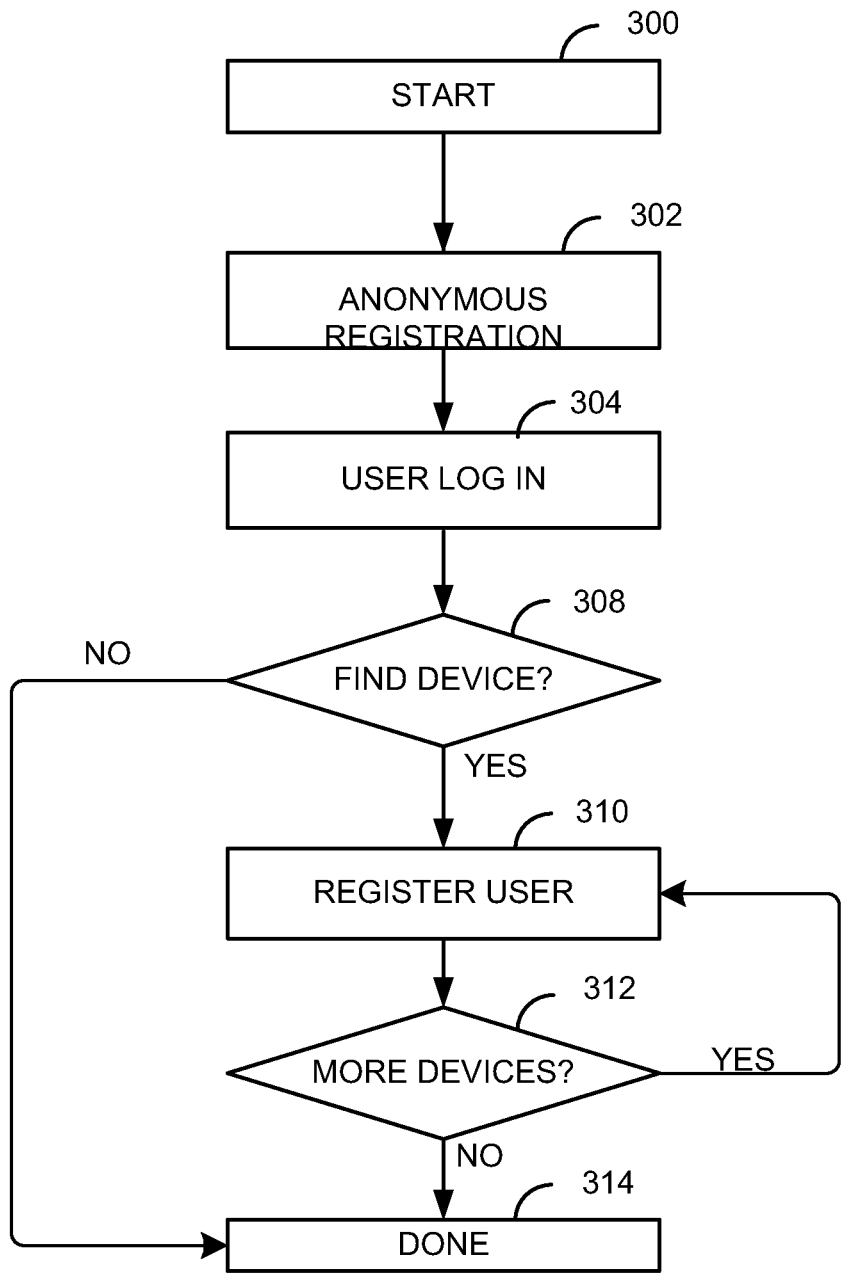
FIG. 3 is a flowchart illustrating aspects of the operation of a system in accordance with embodiments of the present disclosure.

FIG. 3 shows an illustrative flowchart illustrating aspects of the operation of a system in accordance with embodiments of the present disclosure. In step 300, the process starts and proceeds to step 302 where a second device anonymously registers on a network. The second device performs the anonymous registration by providing a token to identify itself to the network. In step 304, a user registers (e.g., logs onto) a first device connected to the same network. The device may be in a non-virtual environment, or a VDI environment. The network may receive the registration information from the first device and the second device in any order; for example, the token may be received before or after the registration information, or at the same time. In step 308, the network finds devices associated with the token; in this case, the network finds the second device that is anonymously registered. As discussed above, the network may find devices that are anonymously registered in various ways. For example, in a non-virtual environment, the network may obtain the tokens associated with devices (including applications) from a registry set up by an administrator. In a VDI environment, a VDI application on which a user has registered may be able to discover tokens associated with other devices from the virtual environment (e.g., the network hosting the virtual environment). Thus, the network may find devices on which to register the user. Said another way, the controlling application may post registration information and token information regarding devices for which the user would like to automatically register to the network. If an anonymously registered device associated with the token is found, the process proceeds to step 310. If an anonymously registered device associated with the token is not found, the process proceeds to step 314, where it ends.

In step 310, the network automatically registers the user on the second device. For example, upon locating the anonymously registered device (e.g., the second device), the network sends a notification to the anonymously registered device with the user's registration information and thereby registers the user on the second device.

In step 312, the network searches for other anonymously registered devices that are associated with additional tokens. If the network finds another anonymously registered device on which to register the user, the network returns to step 310 to automatically register the user on the additional device. If the network does not find any other anonymously registered device associated with the user, the network proceeds to step 314, where the process ends.

Figure 4:
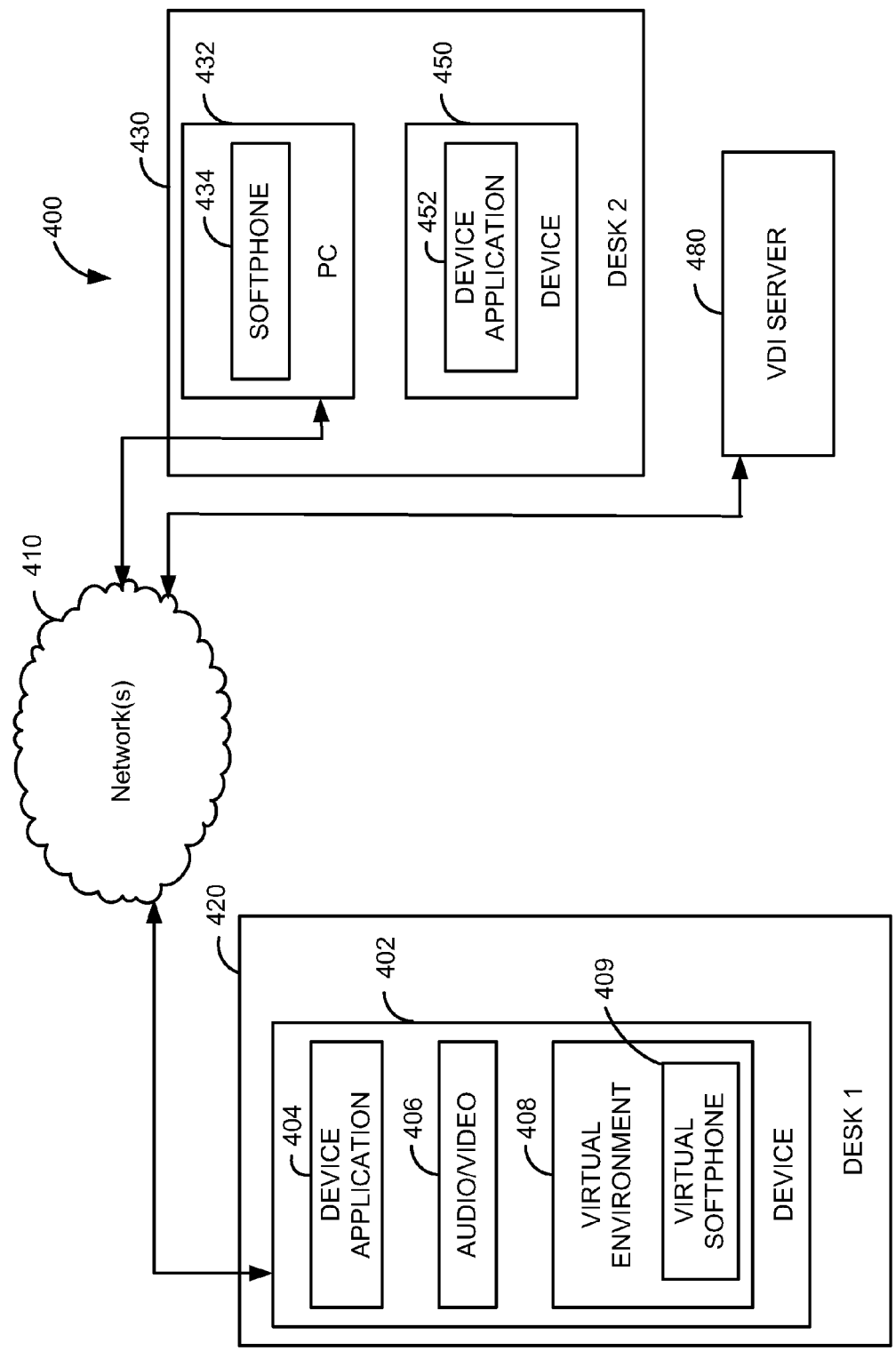
FIG. 4 is a block diagram of a system in accordance with embodiments of the present disclosure.

FIG. 4 shows a block diagram of a system 400 in accordance with embodiments of the present disclosure. Device 402 and telephone 416 are physically grouped together at desk 1 420. Device 402 includes device application 404, virtual environment 408, and audio/video equipment 406, which is native to device 402. In embodiments, the device application 404 may be an application that is native to the device 402. Virtual softphone 409 is hosted on VDI server 480 and rendered in virtual environment 408 on device 402. In embodiments, virtual environment 408 is provided by a VDI server (not shown), rendered on a browser, and accessed by users on device 402. Thus, in embodiments, the device 402 may be a single physical device containing two environments; the native environment and the virtual environment. The native operating system of device 402 has device application 404 that may use audio/video 406. For example, device application 404 may be a softphone application that receives and/or sends audio using audio/video 406. In FIG. 4, multiple devices are connected to network 410. Device 402 is connected to network 410. In embodiments, communications handled by virtual environment 408 may be implemented in connection with SIP.

System 400 also includes desk 2 430, which has a PC 432 running a softphone 434, and a device 450 running a device application 452, which are physically at desk 2. In embodiments, device 450 may be a telecommunications device, such as a telephone.

In FIG. 4, various users may want to use the desks and/or the devices located at the desks. The network 410 has a registry that has been programmed with tokens for the devices and applications via anonymous registration, as well as associations between the devices and their desk locations, and associations between users and the desks. In addition, the network's registry has registration information for each user at each device for which they may automatically register. In embodiments, a desktop configuration manager (e.g., PPM on SM) may perform the anonymous registrations, the associations between users and tokens and/or desks, and the automatic registrations. Thus, device applications 404 and 452 anonymously register on the network using their respective tokens.

In embodiments, the first user logs on to virtual softphone 409 in virtual environment 408, hosted by VDI server 480, and rendered on VDI device 402. For example, the user starts up virtual softphone 409, which registers on the network using SSO. This registration carries the same token as that supplied by device application 404. As discussed above, the token is either discovered by the virtual softphone 409 from the host operating system, or it is supplied by the user. The network looks up the devices associated with desk 1 420 using the provided token. The network then automatically registers the first user on the device application 404 on device 402. In embodiments, the first user may log into the native operating system on the device 402.

The device 450 and device application 452 anonymously register with the network using token information. The second user uses desk 2 and logs on to the PC 432 and the softphone 434. In embodiments, one or both of these logins may be accomplished using SSO. The network looks up the devices and/or applications associated with desk 2 430 using the provided tokens. The network then automatically registers the second user on device 450 and device application 452.

In embodiments, after automatically registering the first user and the second user on their associated devices, the network ends the anonymous registrations. For example, the network may delete the registrar containing the association, registration, and token information. In embodiments, the network may end only certain anonymous registrations while letting others remain.

The exemplary systems and methods of this disclosure are described in relation to a distributed processing network. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show certain of the various components of the system as being collocated, certain components of the system can be located remotely, at distant portions of a distributed network, such as a LAN and/or the Internet, or within a dedicated system. Thus, it should be appreciated, that the components of the system can be combined in to one or more devices, such as a communication device rather than a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of other variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. The features of the embodiments of the disclosure may be combined in alternate embodiments other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the description of the disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. A method for user registration, wherein a user is logged in to a first device in communication with a server, comprising:
   (a) receiving an anonymous registration of a second device comprising a token, wherein the second device is a device of the user and the second device is in communication with the server;
   (b) receiving a credential of the user and receiving the token;
   (c) finding the second device using the token;
   (d) registering the user on the second device using the credential; and
   (e) ending the anonymous registration and deleting an association between the user and the first device.

2. The method of claim 1, wherein the credential and the token are provided by an application on the first device.

3. The method of claim 1, wherein at least one of the first device and the second device is running a virtual desktop environment.

4. The method of claim 1, wherein at least one of the first device and the second device is running a first virtual desktop environment, and wherein the other of the first device and the second device is not running a second virtual desktop environment.

5. The method of claim 1, wherein the token is at least one of a desk number and a Media Access Control ("MAC") address.

6. The method of claim 1, wherein the credential is a non-Session Initiation Protocol ("SIP") credential.

7. The method of claim 1, further comprising registering the user on a third device, wherein the third device is in communication with the server.

8. The method of claim 1, wherein the second device is a telephone.

9. The method of claim 1, wherein the second device is a softphone.

10. A non-transitory computer readable medium comprising processor executable instructions that are executable by a processor to facilitate a communication session between a first device and a server, wherein a user is logged in to the first device in communication with the server, the instructions comprising:
   (a) receiving an anonymous registration of a second device comprising a token, wherein the second device is a device of the user and the second device is in communication with the server;
   (b) receiving a credential of the user and the token;
   (c) finding the second device using the token;
   (d) registering the user on the second device using the credential; and
   (e) ending the anonymous registration and deleting an association between the user and the first device.

11. A system, comprising:
   (a) a server;
   (b) a first device in communication with the server, wherein a user is logged in to the first device;
   (c) a second device in communication with the server, wherein the second device is a device of the user and the second device is anonymously registered with the server using a token;
   wherein the server receives a credential of the user, the token, and an association between the user and the token;
   wherein the server finds the second device using the token;
   wherein the server registers the user on the second device using the credential; and
   wherein the anonymous registration is ended and an association between the user and the first device is deleted.

12. The system of claim 11, wherein the credential and the token are provided by an application on the first device.

13. The system of claim 11, wherein at least one of the first device and the second device is running a virtual desktop environment.

14. The system of claim 11, wherein at least one of the first device and the second device is running a first virtual desktop environment, and wherein the other of the first device and the second device is not running a second virtual desktop environment.

15. The system of claim 11, wherein the token is at least one of a desk number and a Media Access Control ("MAC") address.

16. The system of claim 11, wherein the credential is a non-Session Initiation Protocol ("SIP") credential.

17. The system of claim 11, further comprising registering the user on a third device, wherein the third device is in communication with the server.

18. The system of claim 11, wherein the second device is a softphone.

19. The method of claim 1, wherein the token is saved on at least a registrar, and step (e) includes deleting the token from the registrar.

20. The system of claim 11, wherein the token is saved on at least a registrar, and the token is deleted from the registrar when the anonymous registration is ended.

* * * * *